United States Patent [19]

Digman, Sr.

[11] 4,058,928
[45] Nov. 22, 1977

[54] DISPOSABLE FLY KILLER CONTAINER

[75] Inventor: Robert Howard Digman, Sr., Desert Hot Springs, Calif.

[73] Assignee: The Raymond Lee Organization, Inc., New York, N.Y.

[21] Appl. No.: 715,454

[22] Filed: Aug. 18, 1976

[51] Int. Cl.² ............................................. A01M 1/20
[52] U.S. Cl. ...................................................... 43/131
[58] Field of Search ................ 43/131, 124, 129, 132; 239/53, 54, 55, 56

[56] References Cited

U.S. PATENT DOCUMENTS

| 1,759,359 | 5/1930 | Lennox | 43/131 |
| 2,565,142 | 8/1951 | Mattingly | 43/131 |

FOREIGN PATENT DOCUMENTS

| 32,643 | 10/1964 | Germany | 43/131 |

Primary Examiner—Warner H. Camp
Attorney, Agent, or Firm—Howard I. Podell

[57] ABSTRACT

A container in the form of a circular or rectangular cross-section box is fitted with a removable cover and enclosing an open chamber in the center of which a circular disc is mounted on a support. The disc is coated or impregnated with a fly contact poison and an insect attractive scent. Insects killed by contact with the disc fall into the bottom of the box. A string attached to the center of the disc serves as a means for suspending the unit from a hanger.

1 Claim, 5 Drawing Figures

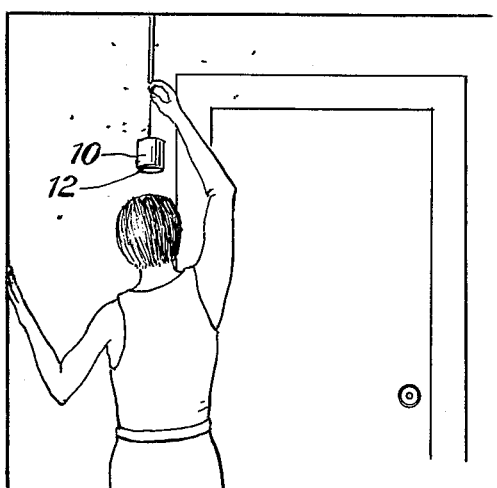
FIG. 1
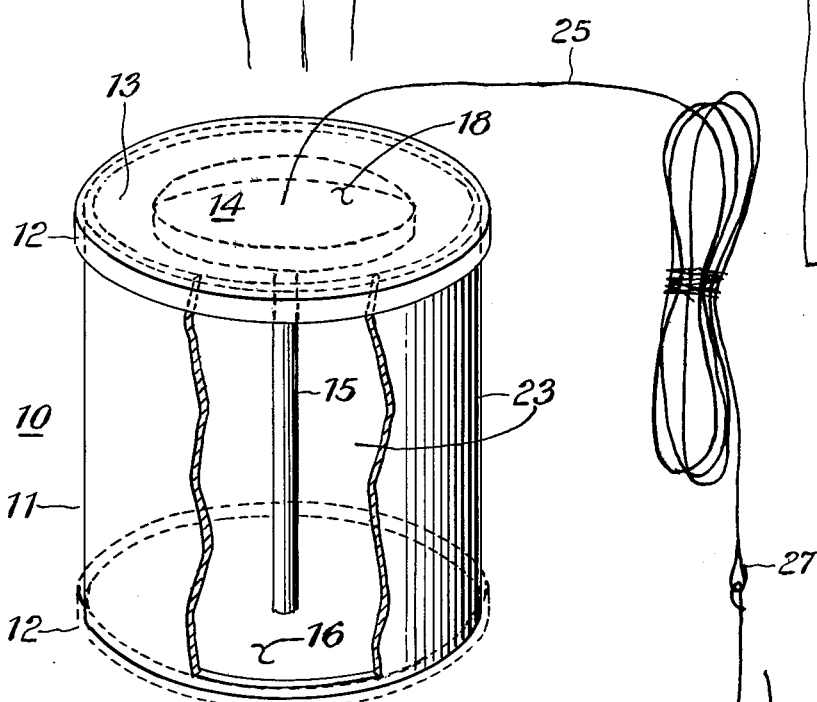
FIG. 2
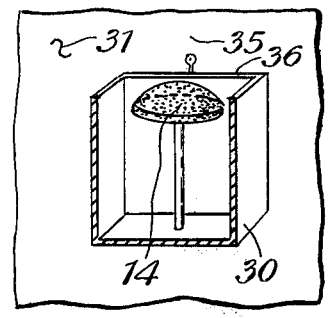
FIG. 4
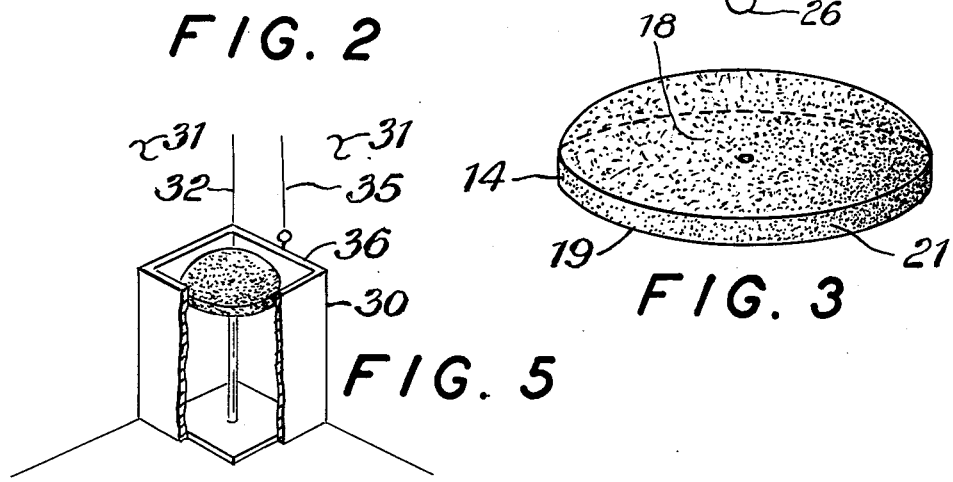
FIG. 5
FIG. 3

DISPOSABLE FLY KILLER CONTAINER

SUMMARY OF THE INVENTION

My invention is a container for trapping and killing insects such as house flies. The container is in the form of a circular or rectangular cross-section box fitted with a removable cover and enclosing an open chamber in the center of which a circular disc is mounted on a support. The disc is coated or impregnated with a fly contact poison and an insect attractive scent. Insects killed by contact with the disc fall into the bottom of the box. A string attached to the center of the disc serves as a means for suspending the unit from a hanger.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the invention in use;

FIG. 2 is a perspective view of the invention;

FIG. 3 is a perspective view of the poison disc of the invention;

FIG. 4 is a perspective view of an alternate embodiment of the invention; and

FIG. 5 is a perspective view of the alternate embodiment in use.

DESCRIPTION OF THE PREFERRED EMBODIMENT

Turning now descriptively to the drawings, in which similar reference characters denote similar elements throughout the several views, FIGS. 1-2 illustrate the fly killer container 10 in the form of a cylindrical box 11 fitted with a removable flanged cover 12 and housing an internal chamber 13 in which a dome shaped disc 14 is mounted on an axial support 15 fixed to the bottom 16 of the container.

Disc 14 is shaped with a convex dome on its upper surface 18 as shown in FIGS. 2-3 with the upper surface 18, lower surface 19, and outer circular rim 21 of the disc 14 coated with a poisonous contact insectide such as 2, 2-Dichorovinyl Dimethyl Phosphate. An insect attractive scent may also be coated on the surfaces of disc 14 or in the interior of the box 11. Disc 14 is located so as to lie a spaced distance below the plane of the top opening of box 11 covered, when not in use, by cover 12, and a spaced distance from the internal wall surface 23 of box 11 so that flies killed by contact with disc 14 will fall onto the bottom 16 of the box 11. Box 11 is formed with an external cylindrical wall of uniform external diameter so that cover 12 may be fitted, in use, on the bottom of the box, as shown by the dash lines of FIG. 2.

A length of string 25 is fastened to the center of disc 14, with a hook 26 fitted to the free end 27 of the string for suspending the unit, when open from a hanger (not shown).

Alternately, as shown in FIGS. 4-5, a box 30 of rectangular cross-section may be employed instead of cylindrical box 11 so as to rest against a flat wall 31 or in an internal corner 32 formed by two walls 31. String 35 may be fixed to the mid-section of a wall 36.

Alternately disc 14 may be formed of a porous material and impregnated with an insectide.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An insect trap in the form of a hollow box fitted with a removable cover, said box formed with an internal support member fixed to a contact member, said contact member located by spaced distances from the inside surfaces of the box and cover, with the contact member in the form of a circular disc, formed with a convex surface located to face the removable cover, with the said convex surface of the contact member coated with an insecticide.

* * * * *